US012218391B2

(12) United States Patent
Park et al.

(10) Patent No.: US 12,218,391 B2
(45) Date of Patent: Feb. 4, 2025

(54) POLYMER ELECTROLYTE MEMBRANE, MANUFACTURING METHOD THEREFOR, AND ELECTROCHEMICAL DEVICE COMPRISING SAME

(71) Applicant: KOLON INDUSTRIES, INC., Seoul (KR)

(72) Inventors: Jung Hwa Park, Seoul (KR); Kwang Sei Oh, Seoul (KR); Dong Hoon Lee, Seoul (KR); Na Young Kim, Seoul (KR); Eun Su Lee, Seoul (KR); Seung Jib Yum, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 560 days.

(21) Appl. No.: 17/620,199

(22) PCT Filed: Jul. 3, 2020

(86) PCT No.: PCT/KR2020/008705
§ 371 (c)(1),
(2) Date: Dec. 17, 2021

(87) PCT Pub. No.: WO2021/006551
PCT Pub. Date: Jan. 14, 2021

(65) Prior Publication Data
US 2022/0238901 A1 Jul. 28, 2022

(30) Foreign Application Priority Data

Jul. 8, 2019 (KR) .................... 10-2019-0082178

(51) Int. Cl.
*H01M 8/1027* (2016.01)
*H01M 8/1023* (2016.01)
*H01M 8/1025* (2016.01)
*H01M 8/1032* (2016.01)
*H01M 8/1044* (2016.01)
*H01M 8/106* (2016.01)
*H01M 8/1072* (2016.01)
*H01M 8/1081* (2016.01)

(52) U.S. Cl.
CPC ....... *H01M 8/1027* (2013.01); *H01M 8/1025* (2013.01); *H01M 8/1072* (2013.01); *H01M 8/1023* (2013.01); *H01M 8/1032* (2013.01); *H01M 8/1044* (2013.01); *H01M 8/106* (2013.01); *H01M 8/1081* (2013.01)

(58) Field of Classification Search
None
See application file for complete search history.

(56) References Cited

U.S. PATENT DOCUMENTS

| 2004/0005474 A1 | 1/2004 | Charnock |
| 2016/0260995 A1 | 9/2016 | Lee |
| 2018/0351192 A1 | 12/2018 | Lee |

FOREIGN PATENT DOCUMENTS

| CN | 101003623 A | 7/2007 |
| CN | 104046001 A | 9/2014 |
| CN | 104871354 B | 4/2018 |
| EP | 1284518 A1 | 2/2003 |
| JP | 2003-528188 A | 9/2003 |
| KR | 1020070019837 A | 2/2007 |
| KR | 20140112174 A | 9/2014 |
| KR | 20160038851 A | 4/2016 |
| KR | 101666887 B1 | 10/2016 |
| KR | 20180003295 A | 1/2018 |
| WO | 2011078465 A2 | 6/2011 |

OTHER PUBLICATIONS

The office action dated Jan. 31, 2023 related to the corresponding Japanese Patent application.
The references cited in the search report dated Mar. 11, 2024 related to the corresponding European Patent application.
KR office action dated Apr. 12, 2022.
The office action dated Sep. 9, 2023 related to the corresponding Chinese Patent application.

*Primary Examiner* — Jonathan Crepeau
(74) *Attorney, Agent, or Firm* — Harvest IP Law, LLP

(57) ABSTRACT

Disclosed are: a reinforced composite membrane-type polymer electrolyte membrane which can prevent the loss of an ion conductor even when the ion conductor is chemically deteriorated due to long-term use, and thus has remarkably enhanced mechanical and chemical durability; a method for manufacturing same; and an electrochemical device comprising same. The polymer electrolyte membrane of the present invention comprises: a non-crosslinked ion conductor; and a porous support having a plurality of pores filled with the ion conductor, wherein the porous support comprises a polymer having at least one crosslinking functional group, and the crosslinking functional group is a functional group which, when the ion conductor is deteriorated, can cause crosslinking of the ion conductor by binding to the deteriorated ion conductor.

14 Claims, No Drawings

POLYMER ELECTROLYTE MEMBRANE, MANUFACTURING METHOD THEREFOR, AND ELECTROCHEMICAL DEVICE COMPRISING SAME

CROSS REFERENCE TO RELATED APPLICATIONS

This application is a National Stage of International Application No. PCT/KR2020/008705 filed Jul. 3, 2020, claiming priority based on Korean Patent Application No. 10-2019-0082178 filed Jul. 8, 2019.

TECHNICAL FIELD

The present disclosure relates to a polymer electrolyte membrane, a method for manufacturing the same, and a membrane electrode assembly including the same, and more particularly to a reinforced composite membrane-type polymer electrolyte membrane that is capable of preventing loss of ion conductors even when the ion conductors are chemically degraded upon long-term use and thereby exhibits greatly improved mechanical and chemical durability, a method for manufacturing the same, and an electrochemical device including the same.

BACKGROUND ART

As used herein, the term "electrochemical device" encompasses a power-generating device (e.g., a fuel cell) and an energy-saving device (e.g., a redox flow battery: RFB).

A fuel cell that generates electricity through bonding between hydrogen and oxygen has advantages of continuously generating electricity as long as hydrogen and oxygen are supplied and having efficiency about twice as high as that of an internal combustion engine because no heat is lost.

In addition, the fuel cell emits fewer pollutants because it directly converts the chemical energy generated by bonding between hydrogen and oxygen into electrical energy. Accordingly, the fuel cell has advantages of being environmentally friendly and alleviating concern over resource depletion caused by increased energy consumption.

A stack that actually generates electricity in the fuel cell has a stacked structure of several to dozens of unit cells, each including a membrane-electrode assembly (MEA) and a separator (also referred to as a "bipolar plate"). The membrane-electrode assembly generally includes an anode (also referred to as a "fuel electrode"), a cathode (also referred to as an "air electrode"), and an electrolyte membrane interposed therebetween.

The fuel cell may be classified into an alkaline electrolyte fuel cell, a polymer electrolyte fuel cell (PEMFC) and the like, depending on the state and type of the electrolyte. Among them, the polymer electrolyte fuel cell is receiving attention as a portable power supply for vehicular and domestic use due to the advantages of a low operating temperature of less than 100° C., quick start-up, rapid response, and excellent durability.

Typical examples of the polymer electrolyte fuel cell include a proton exchange membrane fuel cell (PEMFC), which uses hydrogen gas as a fuel, a direct methanol fuel cell (DMFC), which uses liquid methanol as a fuel, and the like.

The reaction occurring in the polymer electrolyte fuel cell will be briefly described.

First, when a fuel such as hydrogen gas is supplied to an anode, the hydrogen at the anode is oxidized to produce a proton ($H^+$) and an electron ($e^-$). The produced proton is transferred to the cathode through the polymer electrolyte membrane, whereas the produced electron is transferred to the cathode through an external circuit. Oxygen supplied to the cathode is bonded to the proton and the electron and is thus reduced, thereby producing water.

Meanwhile, in order to realize commercialization of the polymer electrolyte fuel cell, there are still many technical barriers to be overcome, and the essential factors to be improved include high performance, a long lifetime, and low cost. The component having the greatest influence thereon is a membrane electrode assembly. In particular, a polymer electrolyte membrane is one of the key factors that have the greatest influence on the performance and cost of the membrane electrode assembly.

A polymer electrolyte membrane for fuel cells requires high ion conductivity, excellent chemical durability, high mechanical strength, high heat resistance, low hydrogen gas permeability, excellent dimensional stability and the like.

Meanwhile, a redox flow battery (RFB) is a secondary battery that can be used for a long time by being repeatedly charged and discharged through a reversible electrochemical reaction involving an electrolyte.

The redox flow battery (RFB) generally includes two types of liquid electrolytes that are isolated from each other via a polymer electrolyte membrane (also referred to as an "ion exchange membrane"). A first liquid electrolyte reaction at an anode is different from a second liquid electrolyte reaction at a cathode, causing a difference in pressure. In order to overcome this pressure difference and exhibit excellent battery performance even after repeated charging and discharging, the polymer electrolyte membrane requires high ionic conductivity and excellent physical and chemical stability.

A reinforced composite membrane-type polymer electrolyte membrane including a porous support impregnated with an ion conductor has been developed in order to improve the mechanical strength and dimensional stability of the polymer electrolyte membrane for electrochemical devices.

The ion conductor generally has a problem in that chemical resistance is reduced when used for a long time, although the severity of this problem varies depending on the application field. As a result, when chemical degradation of the ion conductor occurs, the decomposed ion conductor is eluted from the polymer electrolyte membrane, thus deteriorating the physical properties (particularly, the ionic conductivity) of the polymer electrolyte membrane. In particular, once radical end groups and/or ionic end groups are caused due to degradation of the ion conductor, they cause a chemical chain reaction, leading to rapid degradation of the polymer electrolyte membrane.

In an attempt to prevent degradation of the ion conductor and elution of the ion conductor caused thereby, the use of a crosslinked ion conductor has been proposed. However, this is problematic in that (i) since separate complicated crosslinking processes are required in order to impart the ion conductor with a crosslinked structure, the productivity of the polymer electrolyte membrane cannot but be reduced while increasing the manufacturing costs, and (ii) since the crosslinked ion conductor has low fluidity, it can hardly be applied to a reinforced composite membrane-type polymer electrolyte membrane which requires impregnation of the pores of a porous support with an ion conductor.

DISCLOSURE

Technical Problem

Therefore, the present disclosure has been made in view of the above problems, and is directed to a polymer electrolyte membrane, a method for manufacturing the same, and a membrane electrode assembly including the same.

It is one aspect of the present disclosure to provide a reinforced composite membrane-type polymer electrolyte membrane that does not require a separate and complicated crosslinking process and thus can be manufactured with higher productivity at a lower cost, and is capable of preventing ion conductors from being lost even when the ion conductors are chemically degraded upon long-term use and thereby exhibits greatly improved mechanical and chemical durability.

It is another aspect of the present disclosure to provide a method for manufacturing a reinforced composite membrane-type polymer electrolyte membrane that is capable of preventing ion conductors from being lost even when the ion conductors are chemically degraded upon long-term use and thereby exhibits greatly improved mechanical and chemical durability without increasing costs or deteriorating productivity.

It is another aspect of the present disclosure to provide an electrochemical device that can be manufactured with higher productivity at lower cost and is capable of maintaining superior performance for a long time due to the excellent chemical durability.

In addition to the aspects of the present disclosure described above, other features and advantages of the present disclosure will be disclosed in the following detailed description, as will be clearly understood by those skilled in the art to which the present disclosure pertains.

Technical Solution

In accordance with one aspect of the present disclosure, provided is a polymer electrolyte membrane comprising a non-crosslinked ion conductor and a porous support having a plurality of pores filled with the ion conductor, wherein the porous support comprises a polymer having at least one crosslinking functional group, and the crosslinking functional group is capable of being bonded to the ion conductor upon occurrence of degradation of the ion conductor to thereby cause the degraded ion conductor to be crosslinked.

The polymer may have at least one crosslinking functional group selected from the group consisting of a hydroxyl group (—OH), a carboxyl group (—COOH), and an amine group (—NH$_2$).

The polymer may be a polyphenylene sulfide (PPS) copolymer.

The polyphenylene sulfide (PPS) copolymer may include a first repeating unit having the crosslinking functional group and a second repeating unit not having the crosslinking functional group, and the ratio of the number of the first repeating unit to the number of second repeating unit (the number of first repeating unit:the number of second repeating unit) may be 1:99 to 50:50.

The ratio of the number of first repeating unit to the number of second repeating unit may be 5:95 to 40:60, more preferably 10:90 to 30:70.

The porous support may be a nonwoven web.

The ratio of the apparent volume of the nonwoven web to the total volume of the polymer electrolyte membrane may be 5 to 90%.

The ratio of the apparent volume of the nonwoven web to the total volume of the polymer electrolyte membrane may be 30 to 60%.

The ion conductor may be a fluorine-based ion conductor, a hydrocarbon-based ion conductor, or a mixture thereof.

In accordance with another aspect of the present disclosure, provided is a method for manufacturing a polymer electrolyte membrane, the method including preparing a polymer having at least one crosslinking functional group selected from the group consisting of a hydroxyl group (—OH), a carboxyl group (—COOH), and an amine group (—NH$_2$), forming a porous support using the polymer, and filling pores of the porous support with a non-crosslinked ion conductor.

The polymer may be prepared using a first monomer having the crosslinking functional group and a second monomer not having the crosslinking functional group.

The first monomer may be a diiodine or dichloro monomer represented by the following Formula 1, the second monomer may be para-diiodobenzene (pDIB) or para-dichlorobenzeneyl (pDCB), and the polymer may be prepared by polymerizing sulfur or sodium sulfide with the first and second monomers:

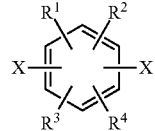

[Formula 1]

[wherein $R^1$, $R^2$, $R^3$ and $R^4$ are each independently a hydrogen atom, a hydroxyl group (—OH), a carboxyl group (—COOH), or an amine group (—NH$_2$), at least one of $R^1$, $R^2$, $R^3$, and $R^4$ is not a hydrogen atom, and X is I or Cl].

The first monomer may be diiodophenol, diiodobenzoic acid, diiodoaniline, or a mixture of two or more thereof.

The first monomer may be dichlorophenol, dichlorobenzoic acid, dichloroaniline, or a mixture of two or more thereof.

The porous support may be a nonwoven web.

The nonwoven web may be formed using a wet-laying process or an electrospinning process.

In accordance with another aspect of the present disclosure, provided is an electrochemical device including an anode, a cathode, and a polymer electrolyte membrane interposed between the anode and the cathode, wherein the polymer electrolyte membrane includes a non-crosslinked ion conductor and a porous support having a plurality of pores filled with the ion conductor, wherein the porous support includes a polymer having at least one crosslinking functional group, and the crosslinking functional group is capable of being bonded to the ion conductor upon occurrence of degradation of the ion conductor to thereby cause the degraded ion conductor to be crosslinked.

The general description of the present disclosure is provided only for illustration of the present disclosure and does not limit the scope of the present disclosure.

Advantageous Effects

In accordance with the present disclosure, leakage of the degraded ion conductor from the polymer electrolyte membrane can be prevented by introducing into the porous support a crosslinking functional group that is capable of crosslinking the degraded ion conductor by being bonded to radical end groups and/or ionic end groups produced by degradation of the ion conductor.

Accordingly, the porous support enables an improvement in the mechanical durability and dimensional stability of the polymer electrolyte membrane and the electrochemical device including the same, suppresses leakage of the ion conductor even when chemical degradation of the ion conductor occurs after long-term use, and thus greatly improves the chemical durability of the polymer electrolyte membrane and the electrochemical device including the same.

In addition, according to the present disclosure, the chemical durability of the polymer electrolyte membrane can be remarkably improved without using a crosslinked ion conductor, which increases costs, decreases productivity, and hinders impregnation into a porous support. That is, according to the present disclosure, the chemical durability of the polymer electrolyte membrane can be remarkably improved without increasing costs, decreasing productivity, or deteriorating impregnation into a porous support.

BEST MODE

Hereinafter, embodiments of the present disclosure will be described in detail with reference to the accompanying drawings. However, the following embodiments are illustratively provided merely for clear understanding of the present disclosure, and do not limit the scope of the present disclosure.

The polymer electrolyte membrane according to the present disclosure is a reinforced composite membrane-type polymer electrolyte membrane including a non-crosslinked ion conductor and a porous support having a plurality of pores filled with the ion conductor.

The ion conductor may be a cation conductor having at least one cation exchange group selected from the group consisting of a sulfonic group, a carboxyl group, a boronic group, a phosphoric group, an imide group, a sulfonimide group, a sulfonamide group, and a sulfonyl fluoride group. Specifically, in an embodiment, the ion conductor may be a cation conductor having a sulfonic group and/or a carboxyl group as the cation exchange group.

In addition, the ion conductor may be a fluorine-based ion conductor, a hydrocarbon-based ion conductor, or a mixture thereof.

The fluorine-based ion conductor may have the cation exchange group in the side chain thereof, may contain fluorine in the main chain thereof, and may be a fluorine-based polymer (e.g., poly(perfluorosulfonic acid) or poly(perfluorocarboxylic acid)).

The hydrocarbon-based ion conductor may be a hydrocarbon-based polymer having the cation exchange group in a side chain thereof (e.g., sulfonated polyimide (S-PI), sulfonated polyarylethersulfone (S-PAES), sulfonated polyether ether ketone (SPEEK), sulfonated polybenzimidazole (SPBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, sulfonated polyarylene ether sulfone ketone or the like).

The porous support of the present disclosure contains a polymer having at least one crosslinking functional group. The crosslinking functional group of the present invention is a functional group that is capable of being bonded to the ion conductor upon occurrence of degradation of the ion conductor to thereby cause the degraded ion conductor to be crosslinked.

For example, the degradation mechanism of a general hydrocarbon-based ion conductor is as follows, and a fluorine-based ion conductor is also degraded by a similar mechanism if there is a difference in electron density.

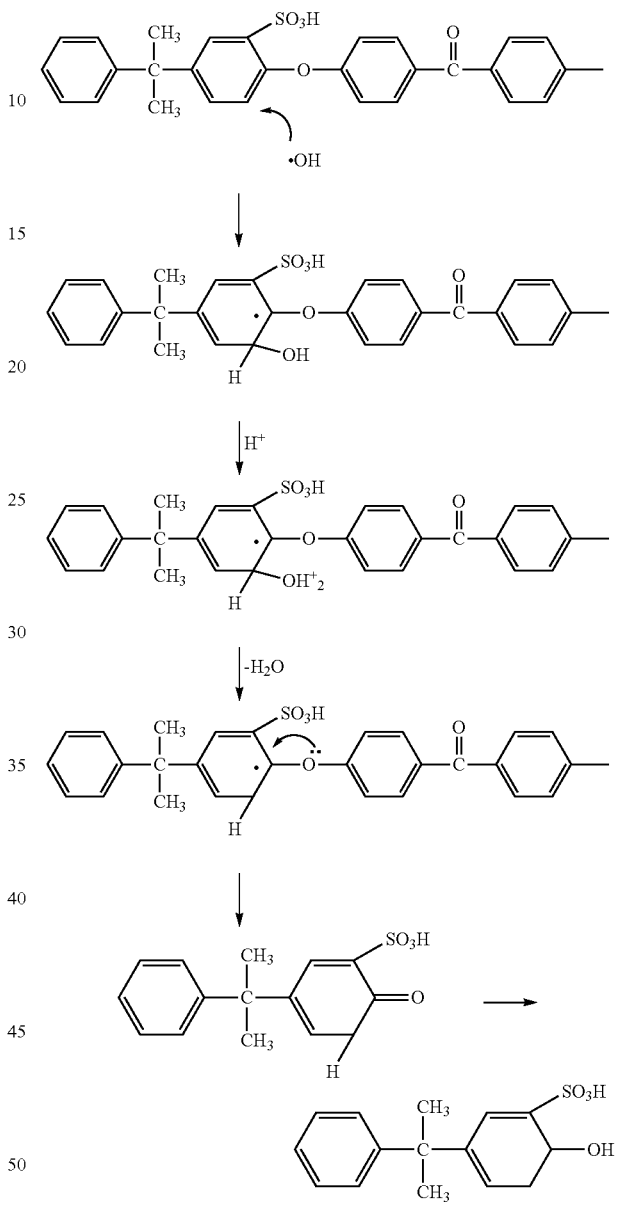

<Example of Degradation Mechanism of Hydrocarbon-Based Ion Conductor>

Radical end groups (e.g., —COO·, —CO·, etc.) and/or ionic end groups (e.g., —COO$^-$, —O$^-$, —CO$^{2-}$, etc.) produced by cleaving of the main chain due to chemical degradation of the ion conductor chemically react with the crosslinking functional groups of the crosslinking agent of the present disclosure to form amide groups or ester groups, thereby crosslinking the degraded ion conductor.

In general, when the temperature is lower than 100° C., the crosslinking reaction of the fluorine-based or hydrocarbon-based ion conductor used in the polymer electrolyte membrane for fuel cells is difficult to induce. The radical end groups and/or ionic end groups produced by degradation of the ion conductor react immediately with the crosslinking functional groups of the present disclosure, so cross-linking of the ion conductor can be forcibly performed without a separate temperature increase process for crosslinking.

In addition, the ion conductor used in the preparation of the polymer electrolyte membrane of the present disclosure is a non-crosslinked ion conductor having fluidity superior to that of a crosslinked ion conductor, so the pores in the porous support can be easily filled with the ionic conductor. Therefore, a water channel through which hydrogen ions can move is well formed in the thickness direction (through plane) of the porous support, thereby imparting excellent ionic conductivity to the polymer electrolyte membrane, while a channel through which hydrogen gas can move is complicated, thereby imparting relatively low hydrogen gas permeability to the polymer electrolyte membrane.

In an embodiment of the present disclosure, the polymer of the porous support has at least one crosslinking functional group selected from the group consisting of a hydroxyl group (—OH), a carboxyl group (—COOH), and an amine group (—NH$_2$).

For example, the polymer may be (i) polyolefin (e.g., polyethylene, polypropylene, polybutylene, etc.) substituted with the crosslinking functional group, (ii) polyester (e.g., PET, PBT, etc.), (iii) polyamide (e.g., nylon-6, nylon-6,6, aramid, etc.), (v) polyurethane, (vi) polybutene, (vii) polylactic acid, (viii) polyvinyl alcohol, (ix) polyphenylene sulfide (PPS), (x) polysulfone, (xi) a fluid crystalline polymer, (xii) polyethylene-co-vinylacetate, (xiii) polyacrylonitrile, (xiv) cyclic polyolefin, (xv) polyoxymethylene, (xvi) a polyolefin-based thermoplastic elastomer, or (xvii) a copolymer of two or more thereof.

In particular, the polymer may be a polyphenylene sulfide (PPS) copolymer substituted with the crosslinking functional group, and may be represented by Formula 2 below.

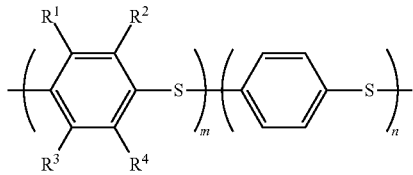

[Formula 2]

wherein $R^1$, $R^2$, $R^3$ and $R^4$ are each independently a hydrogen atom, a hydroxyl group (—OH), a carboxyl group (—COOH), or an amine group (—NH$_2$), at least one of $R^1$, $R^2$, $R^3$ and $R^4$ is not a hydrogen atom, and X is I or Cl.

PPS is a kind of super engineering plastic, exhibits superior mechanical strength, excellent heat resistance, chemical resistance, flame resistance, electrical insulation and the like, and can satisfy high chemical durability, superior mechanical strength, high heat resistance and excellent dimensional stability and the like required for polymer electrolyte membranes for electrochemical devices.

As shown in Formula 2 above, the PPS copolymer substituted with the crosslinking functional group may include a first repeating unit having the crosslinking functional group and a second repeating unit not having the crosslinking functional group. In this case, the ratio (m:n) of the number (m) of first repeating unit to the number (n) of second repeating unit may be 1:99 to 50:50.

When the ratio of the number (m) of first repeating unit to the number (n) of second repeating unit is below the above range, it may be difficult for the crosslinking reaction of the deteriorated ion conductor to occur effectively. On the other hand, when the ratio exceeds the above range, it may be difficult to satisfy the physical properties required for the porous support. In this regard, the ratio of the number of first repeating unit to the number of second repeating unit may be more preferably 5:95 to 40:60, still more preferably 10:90 to 30:70.

According to an embodiment of the present disclosure, the PPS copolymer substituted with a crosslinking functional group has a weight average molecular weight (Mw) of 5,000 to 500,000. When Mw is less than 5,000, it is impossible to produce a porous support having mechanical strength sufficient to prepare a reinforced composite membrane, and when Mw exceeds 500,000, it is not possible to produce a porous support having satisfactory uniformity.

Alternatively, the polymer may be (i) polyparaphenylene substituted with the cross-linkable functional group, (ii) polyphenylene oxide substituted with the cross-linkable functional group, (iii) polyaniline substituted with the cross-linkable functional group, or (iv) polyether ether ketone (PEEK) substituted with the crosslinking functional group, but is not limited thereto.

The polymers described above as specific examples may each independently be used in the preparation of the porous support. Also, a mixture of two or more thereof may be used for preparation of the porous support.

In an embodiment, the porous support may be an expanded film or a nonwoven web. However, some substances (e.g., PPS or a copolymer thereof) may have low connectivity of pores formed through expansion compared to the pores in the nonwoven web, and thus may not be suitable for use as a reinforced composite membrane. Accordingly, nonwoven webs may be preferable than expanded films when producing porous supports from such materials.

The ratio of the apparent volume of the porous support (non-woven web) to the total volume of the polymer electrolyte membrane may be 5 to 90%.

When the ratio is less than 5%, the effect of improving dimensional stability and mechanical durability due to adoption of the porous support is unsatisfactory. On the other hand, when the ratio is higher than 90%, the thickness of the ion conductor layer located on the upper or lower surface of the porous support is excessively small and thus the sheet resistance is increased. In consideration thereof, the ratio of the apparent volume of the porous support to the total volume of the polymer electrolyte membrane is more preferably 30 to 60%.

For the same reason as above, the ratio of the thickness of the porous support (non-woven web) to the total thickness of the polymer electrolyte membrane is preferably 5 to 90%, and more preferably 30 to 60%.

In an embodiment of the present disclosure, the porous support may have a thickness of 1 to 50 µm.

When the thickness of the porous support (non-woven web) is less than 1 µm, the mechanical strength of the polymer electrolyte membrane may be lowered. On the other hand, when the thickness of the porous support exceeds 50 µm, resistance loss may increase, and weight reduction and integration may be reduced. In consideration thereof, the porous support preferably has a thickness of 2 to 40 µm, more preferably 3 to 30 µm, and still more preferably 3 to 20 µm.

The porosity of the porous support (non-woven web) may be 45 to 90%, specifically 60 to 90%. When the porosity of the porous support is less than 45%, the amount of the ion conductor in the porous support is excessively small, increasing the resistance of the polymer electrolyte membrane and decreasing ionic conductivity. On the other hand, when the porosity of the porous support exceeds 90%, dimensional stability is lowered and thus subsequent processing may not proceed smoothly.

The term "porosity" refers to the ratio of the volume of air in the porous support to the total volume of the porous support. The total volume of the porous support can be obtained by measuring the width, length, and thickness of a cuboid sample and multiplying these values, and the volume of air in the support can be obtained by subtracting the volume of the material, obtained by dividing the mass of the sample by the density of the porous support material, from the total volume of the porous support.

Hereinafter, a method for manufacturing the polymer electrolyte membrane according to embodiments of the present disclosure will be described in detail.

The method for manufacturing a polymer electrolyte membrane includes preparing a polymer having at least one crosslinking functional group selected from the group consisting of a hydroxyl group (—OH), a carboxyl group (—COOH), and an amine group (—NH$_2$), forming a porous support using the polymer, and filling the pores in the porous support with a non-crosslinked ion conductor.

The polymer may be prepared using a first monomer having the crosslinking functional group and a second monomer not having the crosslinking functional group.

For example, when only monomer A is used to prepare a polymer, monomer A not having the crosslinking functional group is polymerized with monomer A' substituted with a crosslinking functional group in order to introduce the crosslinking functional group of the present disclosure into the polymer.

When monomer A and monomer B are used to prepare the polymer, monomer B may be polymerized with monomer A not having the crosslinking functional group and monomer A' substituted with the crosslinking functional group in order to introduce the crosslinking functional group of the present disclosure into the polymer.

As described above, the polymer according to an embodiment of the present disclosure may be a PPS copolymer substituted with a crosslinking functional group.

The PPS copolymer including a repeating unit having the crosslinking functional group may be prepared by polymerizing solid sulfur or sodium sulfide with first and second monomers, wherein the first monomer is a monomer represented by the following Formula 1, and the second monomer is para-diiodobenzene (pDIB) or para-dichlorobenzene (pDCB):

[Formula 1]

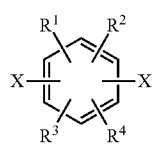

wherein $R^1$, $R^2$, $R^3$ and $R^4$ are each independently a hydrogen atom, a hydroxyl group (—OH), a carboxyl group (—COOH), or an amine group (—NH$_2$), at least one of $R^1$, $R^2$, $R^3$ and $R^4$ is not a hydrogen atom, and X is I or Cl.

More specifically, the first monomer reacting with solid sulfur may be diiodophenol, diiodobenzoic acid, diiodoaniline, or a mixture of two or more thereof, and the first monomer reacting with sodium sulfide in a polar organic solvent may be dichlorophenol, dichlorobenzoic acid, dichloroaniline, or a mixture of two or more thereof.

As described above, the polymer according to another embodiment of the present disclosure may be (i) polyparaphenylene substituted with a cross-linkable functional group, (ii) polyphenylene oxide substituted with a cross-linkable functional group, (iii) polyaniline substituted with a cross-linkable functional group, or (iv) polyether ether ketone (PEEK) substituted with a cross-linkable functional group which may be prepared by the following method.

Polyparaphenylene (PPP) may, for example, be prepared by adding aluminum chloride (AlCl$_3$) and copper chloride (CuCl$_2$) to benzene and then performing radical polymerization.

Polyphenylene oxide (PPO) may be prepared, for example, by oxidation-coupling polymerization of 2,6-dimethylphenol in the presence of a Cu/amine complex catalyst.

Polyaniline (PANI) may be synthesized using, for example, highly purified aniline. Specifically, a 1M aqueous hydrochloric acid solution is added thereto at 0° C. and stirred until the aniline is completely dissolved. The stirring is performed until precipitation occurs. After precipitation, the solution is stirred at 0° C. for 4 hours and at room temperature for 20 hours or more. Then, the polyaniline can be obtained by washing the resulting precipitate.

Polyether ether ketone (PEEK) can be obtained, for example, by melt polymerization of 1,4-benzenediol and 4,4'-difluorobenzophenone with sodium carbonate at 300° C. or higher.

The polymer substituted with a crosslinking functional group of the present disclosure is prepared by using at least part of a monomer substituted with a crosslinking functional group as a corresponding monomer when polymerizing each of the polymers described above (e.g., PPO, PANI, or PEEK).

Alternatively, after a polymer (e.g., PPP, PPO, PANI, or PEEK) is prepared, a polymer substituted with a cross-linkable functional group may be obtained through post-treatment. For example, PPO including an amine group as a crosslinking functional group can be obtained by brominating the PPO using bromine water and then substituting the bromine with an amine again.

Then, a porous support is formed using a support-forming liquid including the polymer prepared as described above.

As described above, the porous support may preferably be an expanded film or a nonwoven web, and more preferably a nonwoven web.

The expanded film may be manufactured by extruding the support-forming liquid into a film and expanding the obtained film to form a plurality of pores in the film.

The nonwoven web may be prepared by any one method selected from the group consisting of wet laying, electrospinning, carding, garneting, air laying, melt blowing, spunbonding and stitch bonding. According to an embodiment of the present disclosure, the nonwoven web may be formed using a wet laying process or an electrospinning process.

Then, the pores of the prepared porous support are filled with an ion conductor.

As described above, the ion conductor may be a fluorine-based ion conductor, a hydrocarbon-based ion conductor, or a mixture thereof, and specific examples thereof have been described above, and thus a description thereof will be omitted.

First, in order to fill the pores in the porous support with the ion conductor, an ion-conductor-containing liquid is prepared. The ion-conductor-containing liquid may be a solution in which the ion conductor is dissolved in a solvent or a dispersion in which the ion conductor is dispersed in a dispersion medium.

Each of the solvent and the dispersion medium may be selected from the group consisting of water, a hydrophilic solvent, an organic solvent, and a mixture thereof.

The hydrophilic solvent may contain a linear or branched saturated or unsaturated hydrocarbon having 1 to 12 carbon atoms in a main chain, may have one or more functional groups selected from the group consisting of alcohol, isopropyl alcohol, ketone, aldehyde, carbonate, carboxylate, carboxylic acid, ether, and amide, and may contain an alicyclic or aromatic cyclic compound in at least a part of the main chain.

The organic solvent may be N-methylpyrrolidone (NMP), dimethylsulfoxide (DMSO), tetrahydrofuran (THF), dimethylacetamide (DMAC), or a mixture of two or more thereof.

Optionally, the ion-conductor-containing liquid may further contain a radical scavenger as an additive. The radical scavenger is an additive that rapidly decomposes peroxides (especially hydrogen peroxide) and/or radicals (especially hydroxyl radicals) that are produced during the operation of the fuel cell and are the major cause of degradation of the ion conductor contained in the polymer electrolyte membrane or the catalyst layer of the anode/cathode. For example, the radical scavenger is (i) at least one transition metal selected from the group consisting of cerium (Ce), nickel (Ni), tungsten (W), cobalt (Co), chromium (Cr), zirconium (Zr), yttrium (Y), manganese (Mn), iron (Fe), titanium (Ti), vanadium (V), molybdenum (Mo), lanthanum (La) and neodymium (Nd), (ii) at least one noble metal selected from the group consisting of silver (Au), platinum (Pt), ruthenium (Ru), palladium (Pd) and rhodium (Rh), (iii) an ion of the transition metal or noble metal, (iv) a salt of the transition metal or noble metal, and/or (iv) an oxide of the transition metal or noble metal.

However, according to the present disclosure, the addition of such a radical scavenger is not required because the durability of the polymer electrolyte membrane is improved using a porous support capable of inhibiting degradation of the ion conductor by chemically bonding with the degradation site of the ion conductor.

Then, the porous support is wetted with the ion conductor-containing liquid. The wetting may be performed by (i) casting the ion conductor-containing liquid on a substrate and then impregnating the porous support with the ion conductor-containing liquid, or (ii) coating the porous support with the ion conductor-containing liquid. The coating may be performed, for example, using bar coating, comma coating, slot die coating, screen printing, spray coating, doctor blade coating, or the like.

The wetting may be affected by various factors such as temperature, time, the thickness of the porous support, the concentration of the ion conductor in the ion-conductor-containing liquid, and the type of solvent/dispersion medium. However, in general, the wetting may be performed at a temperature that is higher than the freezing point of the solvent/dispersion medium and is not higher than 100° C., more particularly from 20 to 70° C., for 1 to 30 minutes.

Then, in order to remove the solvent and the dispersion medium, the porous support wetted with the mixed solution is dried. It should be noted that the drying is performed at a temperature that is not lower than 60° C. but is lower than the melting point of the porous support for 10 minutes to 24 hours depending on the thickness of the electrolyte membrane.

Optionally, the drying may include primary drying performed at 60 to 150° C. for 15 minutes to 1 hour and secondary drying performed at 150 to 190° C. for 3 minutes to 1 hour. More specifically, the primary drying may be performed at 60 to 120° C. for 15 minutes to 1 hour, and the secondary drying may be performed at 170 to 190° C. for 3 minutes to 1 hour.

When the temperature for the primary drying is less than 60° C. or the primary drying time is less than 15 minutes, the solvent/dispersion medium cannot primarily escape, so a dense film cannot be formed, and when the temperature for secondary drying exceeds 190° C. or the secondary drying time exceeds 1 hour, the cation exchanger (e.g., sulfonic acid group) of the ion conductor may be decomposed, and the ionic conductivity of the polymer electrolyte membrane may be reduced. However, the drying temperature should be lower than the melting point of the porous support.

Hereinafter, the membrane electrode assembly of the present disclosure will be described in detail.

The membrane electrode assembly of the present disclosure includes an anode, a cathode, and a polymer electrolyte membrane interposed between the anode and the cathode.

At the anode to which hydrogen gas is supplied, the hydrogen is oxidized to produce a proton ($H^+$) and an electron ($e^-$). The produced proton is transferred to the cathode through the polymer electrolyte membrane, whereas the produced electron is transferred to the cathode through an external circuit.

At the cathode to which oxygen is supplied, the oxygen is bonded to the proton and electron and is thus reduced, thereby producing water.

The anode and the cathode of the membrane electrode assembly of the present disclosure are not particularly limited, and the anode and the cathode of a conventional membrane electrode assembly for fuel cells may be used herein.

The polymer electrolyte membrane of the present disclosure disposed between the anode and the cathode has been described in detail above, and thus a detailed description thereof will be omitted.

Hereinafter, the present disclosure will be described in more detail with reference to specific examples. However, the following examples are provided only for better understanding of the present disclosure, and should not be construed as limiting the scope of the present disclosure.

Example 1

A mixture of pDIB (265.0 g), sulfur (32.0 g), and 2,5-diiodophenol (89.5 g) (20 mol %) was heated from 230° C. to 300° C., and was polymerized for a total of 8 hours while the pressure was reduced in a stepwise fashion from 170 torr to 1 torr or less to prepare a PPS copolymer including a repeating unit having a hydroxyl group. The PPS copolymer was spun using a melt-spinning device, and the resulting fibers were chopped to a length of about 5 mm. The chopped fibers were dispersed at high speed in water and produced into a nonwoven fabric using a sheet former. The nonwoven fabric thus obtained was dried and then calendered to prepare a PPS copolymer nonwoven fabric web having a thickness of about 12 μm. Then, the nonwoven fabric web was wetted with a dispersion containing 20 wt % of perfluorosulfonic acid (PFSA) resin and dried to produce a polymer electrolyte membrane.

Example 2

A polymer electrolyte membrane was prepared in the same manner as in Example 1, except that 2,5-diiodoaniline was used instead of the 2,5-diiodophenol.

Example 3

A polymer electrolyte membrane was prepared in the same manner as in Example 1, except that 2,5-diiodobenzoic acid was used instead of the 2,5-diiodophenol.

Example 4

A polymer electrolyte membrane was prepared in the same manner as in Example 1, except that the nonwoven fabric was wetted with a sulfonated polyarylethersulfone (S-PAES) solution (10 wt %, solvent:DMAC) instead of the PFSA resin dispersion.

Comparative Example 1

A polymer electrolyte membrane was prepared in the same manner as in Example 1, except that a mixture of pDIB and sulfur was used instead of the mixture of Example 1.

Comparative Example 2

A polymer electrolyte membrane was prepared in the same manner as in Example 1, except that an e-PTFE porous support having a thickness of about 12 μm was used instead of the nonwoven fabric web.

The chemical durability of each of the polymer electrolyte membranes prepared in Examples and Comparative Examples above was evaluated and measured in the following manner, and the results are shown in Table 1 below.

[Measurement of Chemical Durability of Polymer Electrolyte Membrane]

In order to evaluate the durability of the polymer electrolyte membrane, a Fenton's test, which is a method for evaluating accelerated chemical degradation, was performed. That is, a polymer electrolyte membrane sample (5 cm×5 cm) was immersed in an aqueous solution containing 10 ppm of $FeSO_4$ and 30 wt % of $H_2O_2$ and then allowed to react while being stirred at 80° C. for 24 hours. In the Fenton's test, $H_2O_2$ forms a hydroxyl radical via Fe' as a catalyst, and the radical acts as a factor causing degradation of the polymer electrolyte, thereby accelerating degradation and causing leakage of the polymer electrolyte and thus membrane thickness reduction and membrane weight loss.

The thickness and weight of the polymer electrolyte membrane were measured before and after the test, and the degree of degradation of the polymer electrolyte membrane was determined based on the thickness reduction, determined through the test, and the weight loss ratio, calculated using the following equation.

*Weight loss ratio (%)=$[(Wo-Wa)/Wo]\times 100$ wherein Wo is the weight before the test and Wa is the weight after the test.

TABLE 1

| | Initial membrane thickness (μm) | Membrane thickness reduction (μm) | Weight loss ratio (%) |
|---|---|---|---|
| Example 1 | 25 | 0 | 2.7 |
| Example 2 | 25 | 0 | 1.6 |
| Example 3 | 25 | 0 | 3.3 |
| Example 4 | 25 | 1 | 3.5 |
| Comparative Example 1 | 25 | 2 | 10.2 |
| Comparative Example 2 | 25 | 2 | 10.8 |

As can be seen from Table 1 above, the polymer electrolyte membranes according to Examples of the present disclosure had much higher chemical durability than the polymer electrolyte membranes of Comparative Examples.

The invention claimed is:

1. A polymer electrolyte membrane comprising:
a non-crosslinked ion conductor; and
a porous support having a plurality of pores filled with the ion conductor,
wherein the porous support comprises a polyphenylene sulfide copolymer substituted with at least one crosslinking functional group selected from the group consisting of a hydroxyl group (—OH), a carboxyl group (—COOH), and an amine group (—$NH_2$),
the polyphenylene sulfide copolymer substituted with the crosslinking functional group comprises:
a first repeating unit having the crosslinking functional group; and
a second repeating unit not having the crosslinking functional group,
a ratio of the number of the first repeating unit to the number of the second repeating unit (the number of first repeating unit: the number of second repeating unit) is 1:99 to 50:50, and
the crosslinking functional group is capable of being bonded to the ion conductor upon occurrence of degradation of the ion conductor to thereby cause the degraded ion conductor to be crosslinked.

2. The polymer electrolyte membrane according to claim 1, wherein the ratio of the number of the first repeating unit to the number of the second repeating unit is 5:95 to 40:60.

3. The polymer electrolyte membrane according to claim 1, wherein the porous support is a nonwoven web.

4. The polymer electrolyte membrane according to claim 3, wherein a ratio of an apparent volume of the nonwoven web to a total volume of the polymer electrolyte membrane is 5 to 90%.

5. The polymer electrolyte membrane according to claim 3, wherein a ratio of an apparent volume of the nonwoven web to a total volume of the polymer electrolyte membrane is 30 to 60%.

6. The polymer electrolyte membrane according to claim 1, wherein the ion conductor is a fluorine-based ion conductor, a hydrocarbon-based ion conductor, or a mixture thereof.

7. A method for manufacturing a polymer electrolyte membrane, the method comprising:
preparing a polymer having at least one crosslinking functional group selected from the group consisting of a hydroxyl group (—OH), a carboxyl group (—COOH), and an amine group (—$NH_2$);
forming a porous support using the polymer; and
filling pores of the porous support with a non-crosslinked ion conductor, wherein the polymer is a polyphenylene sulfide copolymer substituted with the crosslinking functional group, which includes a first repeating unit having the crosslinking functional group and a second repeating unit not having the crosslinking functional group, and wherein a ratio of the number of the first repeating unit to the number of the second repeating unit (the number of first repeating unit: the number of second repeating unit) is 1:99 to 50:50.

8. The method according to claim 7, wherein the polymer is prepared using a first monomer having the crosslinking functional group and a second monomer not having the crosslinking functional group.

9. The method according to claim 8, wherein the first monomer is a monomer represented by the following Formula 1:

[Formula 1]

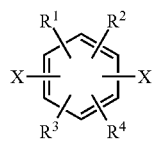

[wherein $R^1$, $R^2$, $R^3$ and $R^4$ are each independently a hydrogen atom, a hydroxyl group (—OH), a carboxyl group (—COOH), or an amine group (—NH$_2$), at least one of $R^1$, $R^2$, $R^3$ and $R^4$ is not a hydrogen atom, and X is I or Cl], the second monomer is para-diiodobenzene or para-dichlorobenzene, and the polymer is prepared by polymerizing solid sulfur or sodium sulfide with the first and second monomers.

10. The method according to claim 9, wherein the first monomer is diiodophenol, diiodobenzoic acid, diiodoaniline, or a mixture of two or more thereof.

11. The method according to claim 9, wherein the first monomer is dichlorophenol, dichlorobenzoic acid, dichloroaniline, or a mixture of two or more thereof.

12. The method according to claim 7, wherein the porous support is a nonwoven web.

13. The method according to claim 12, wherein the nonwoven web is formed using a wet laying process or an electrospinning process.

14. An electrochemical device comprising:
an anode;
a cathode; and
the polymer electrolyte membrane according to claim 1 interposed between the anode and the cathode.

* * * * *